US006068107A

United States Patent [19]

Brun-Jarret

[11] Patent Number: 6,068,107

[45] Date of Patent: May 30, 2000

[54] TRANSFER DEVICE FOR TRANSFERRING PEDESTRIANS BETWEEN TWO SEQUENTIAL MOVING SURFACES

[75] Inventor: Roger Brun-Jarret, Sanary, France

[73] Assignee: Constructions Industrielles de la Mediterranee - CNIM, Paris, France

[21] Appl. No.: 09/296,483

[22] Filed: Apr. 22, 1999

Related U.S. Application Data

[63] Continuation of application No. 08/701,349, Aug. 20, 1996.

[30] Foreign Application Priority Data

Apr. 23, 1996 [FR] France .................................. 96 05109

[51] Int. Cl.$^{7}$ ........................... B65G 13/00; B65G 37/00

[52] U.S. Cl. ......................... 198/600; 198/324; 198/325; 193/35 R; 193/35 MD

[58] Field of Search .................................... 198/324, 325, 198/600; 193/35 R, 35 MD

[56] References Cited

U.S. PATENT DOCUMENTS

| | | | |
|---|---|---|---|
| 2,624,444 | 1/1953 | Casabona | 198/600 |
| 3,020,993 | 4/1962 | Heinrich et al. . | |
| 3,052,337 | 9/1962 | Force, Sr. | 198/324 |
| 3,144,117 | 8/1964 | Fabula et al. | 198/325 |
| 3,518,944 | 7/1970 | Patin | 104/25 |
| 5,044,485 | 9/1991 | Loder . | |
| 5,215,182 | 6/1993 | Garbagnati | 198/325 |
| 5,234,095 | 8/1993 | Patin | 198/324 |
| 5,584,373 | 12/1996 | Layne | 198/600 |

FOREIGN PATENT DOCUMENTS

| | | |
|---|---|---|
| 352968 | 1/1990 | European Pat. Off. . |
| 509861 | 10/1992 | European Pat. Off. . |
| 1583906 | 12/1969 | France . |
| 2693446 | 1/1994 | France . |
| 2 706 880 | 12/1994 | France . |
| 3-186590 | 8/1991 | Japan . |

*Primary Examiner*—Christopher P. Ellis
*Assistant Examiner*—Mark A. Deuble
*Attorney, Agent, or Firm*—Pennie & Edmonds LLP

[57] ABSTRACT

A transfer device for transferring objects, including pedestrians, between sequential moving-surfaces disposed in a common plane. The device comprises first rollers housed in a platform and defining a first object bearing-surface disposed substantially in the common plane. In one embodiment, the rollers comprise balls; in another, they comprise cylinders. A plate mounted on the platform defines a comb that slidably meshes with ribs of a conveyer belt that defines one of the moving surfaces. Second rollers are housed in the plate, providing a second object bearing-surface. The platform pivots within a limited and adjustable angle towards and away from one of the moving surfaces, when an object becomes jammed between the platform and the moving surface, and slides perpendicularly to said angle, by a small amount, when the ribs force the comb laterally.

9 Claims, 3 Drawing Sheets

TRANSFER DEVICE FOR TRANSFERRING PEDESTRIANS BETWEEN TWO SEQUENTIAL MOVING SURFACES

This is a continuation of application Ser. No. 08/701,349 filed Aug. 20, 1996.

BACKGROUND OF THE INVENTION

The present invention relates to a transfer device for transferring objects between two sequential moving-surfaces, and more particularly to a conveyor for pedestrians fitted with such a transfer device.

There are known conveyors comprising a continuous conveyor belt made from a deformable material or from a series of elements with substantially flat transport surfaces, permitting the transportation of pedestrians at a higher speed than a normal walking pace. Such conveyors require an accelerator element between the conveyor belt and the stationary entry floor to gradually accelerate pedestrians from a walking pace to the higher speed of the conveyor belt, and a decelerator element to gradually decelerate pedestrians back to a normal walking pace between the exit of the conveyor belt and the stationary exit floor.

The reference EP-A-0 509 861 discloses a conveyor of the kind defined above. As mentioned in this reference, in order to cross the transition zones between the exit of the accelerator element and the entry of the conveyor belt, and between the exit of the conveyor belt and the entry of the decelerator element, pedestrians must drop from one level to a subsequent transportation element located on a lower level. This drop may cause pedestrians to lose their balance, particularly challenging disabled persons and persons of reduced mobility.

SUMMARY OF THE INVENTION

The present invention overcomes the above-stated inconvenience of known conveyors and provides both a transfer device disposed between two transport elements, and a conveyor fitted with such a device.

The transfer device of the invention transports pedestrians between a first transport element and a second transport element arranged sequentially, each element comprising a substantially flat transport surface for transporting pedestrians. The transfer device comprises a platform for a first pedestrian bearing-surface located substantially in a plane common to the transport surfaces of both transport elements. The first pedestrian bearing-surface comprises rollers permitting the low-friction displacement of the pedestrians from one transport element to the next.

The transfer device also comprises a plate with teeth forming a comb that engages longitudinal grooves in a transport element. This plate is fastened to the transfer device's platform and comprises a second pedestrian bearing-surface also located on substantially the same plane as the platform and also having rollers.

According to a preferred embodiment, the rollers in both the platform and comb-shaped plate comprise balls rotatably accommodated within blind holes. The rollers project beyond the surfaces of the platform and the comb-shaped plate so as to define the aforesaid bearing surfaces for pedestrians. The balls in the platform are held within their corresponding blind holes by a plate fastened to the platform and comprising bores through which the balls extend. The bores have a diameter smaller than the diameter of the balls. The balls in the comb-shaped plate are kept within their corresponding blind holes by flat washers with frusto-conical central holes.

According to another embodiment, the rollers are cylindrical and are mounted for rotation about an axis transverse to the direction of displacement of the pedestrians. The rollers are disposed within semi-cylindrical recesses in the platform and in the comb-shaped plate. The rollers project beyond the surfaces of the platform and comb-shaped plate so as to define the aforesaid bearing surfaces for pedestrians.

In a further embodiment, the platform of the transfer device is pivotally supported on a support frame by supporting feet and loosely fastened to the support frame by two tie-bolts. These tie-bolts are located on either side of the platform beyond its bearing surface and allow the inclination of the platform to be adjusted so that the bearing surfaces are located in a plane substantially in common with the transport surfaces of both transport elements.

The supporting feet are accommodated within inclined supporting grooves in supporting parts fastened to the support frame. These supporting grooves extend transversely to the direction of displacement of the pedestrians, permitting a slight displacement of the platform, on the order of a few millimeters, when the longitudinal grooves of the transport element hits the teeth of the comb-shaped plate.

Each tie-bolt has a threaded end anchored in a tapped hole of a first transverse pin carried by a clevis on the platform. Each tie-bolt's other threaded end extends, with a clearance, through a bore in a second transverse pin that is carried by a clevis fastened to a supporting part that is itself fastened to the support frame. Two nuts on each tie-bolt located on either side of the second transverse pin provide limited axial play to permit the platform to pivot upwards about the supporting feet when an object becomes jammed between the longitudinal grooves of one of the transport elements and the teeth of the comb-like plate.

The invention also provides a conveyor for pedestrians that comprises a conveyor belt and an acceleration or deceleration element at each end of the conveyor belt for loading and unloading pedestrians. Transfer devices as previously defined are arranged between the acceleration element and the conveyor belt and between the conveyor belt and the deceleration element.

The features and advantages of the invention will be further understood from the following non-limiting description and accompanying drawings.

BRIEF DESCRIPTION OF THE DRAWINGS

FIG. 4 is a cross-sectional view from the line IV—IV of FIG. 2.

DESCRIPTION OF THE PREFERRED EMBODIMENTS

The embodiments of the invention will be described as applied to the transportation of pedestrians, but it should be well understood that the invention is also applicable to the conveyance of other objects such as goods, luggage, and the like.

Figures 1, 2:
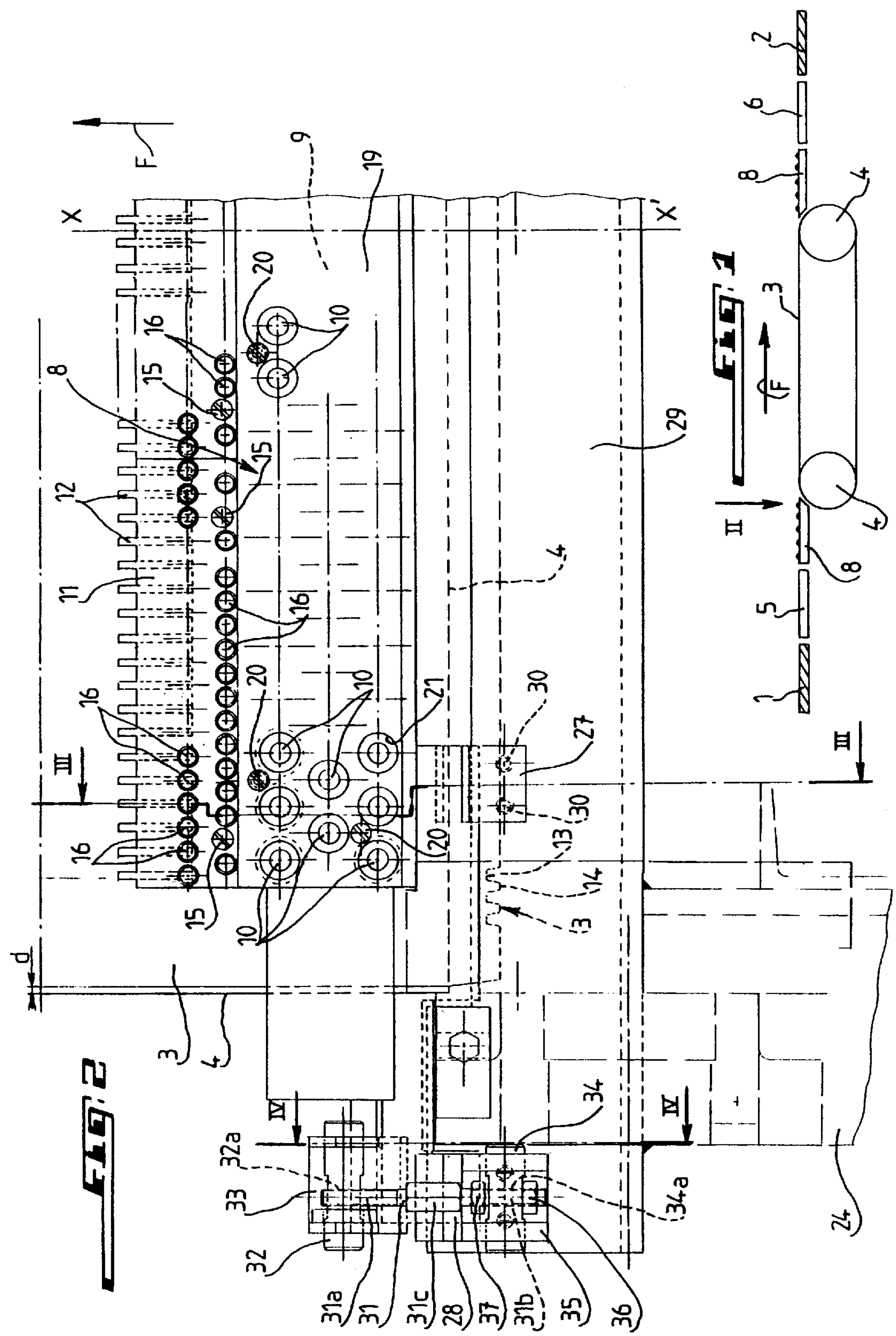
FIG. 1 is a diagrammatic view of a belt-type conveyor according to the invention.
FIG. 2 is a detailed half top-view of the conveyor of FIG. 1 as seen in the direction of the arrow II.

The conveyor shown in FIG. 1 disposed between two stationary floors 1 and 2 has a substantially flat belt 3 for carrying pedestrians in the direction shown by the arrow F, referred to as the longitudinal direction of the belt. The belt 3 is driven by one of two end-drums 4. The drums' 4 axes are arranged transversely to the direction of displacement of the pedestrians.

The conveyor belt 3 moves at a higher seed than a normal pedestrian's walking pace. To bring the pedestrians from their normal walking pace to the relatively high speed of the belt 3, and to bring the pedestrians from the speed of the belt 3 back to their normal walking pace, the conveyor comprises an acceleration element 5 disposed between the stationary entry floor 1 and the entry of the conveyor belt 3, and a deceleration element 6 disposed between the exit of the conveyor belt 3 and the stationary exit floor 2.

Figure 3:
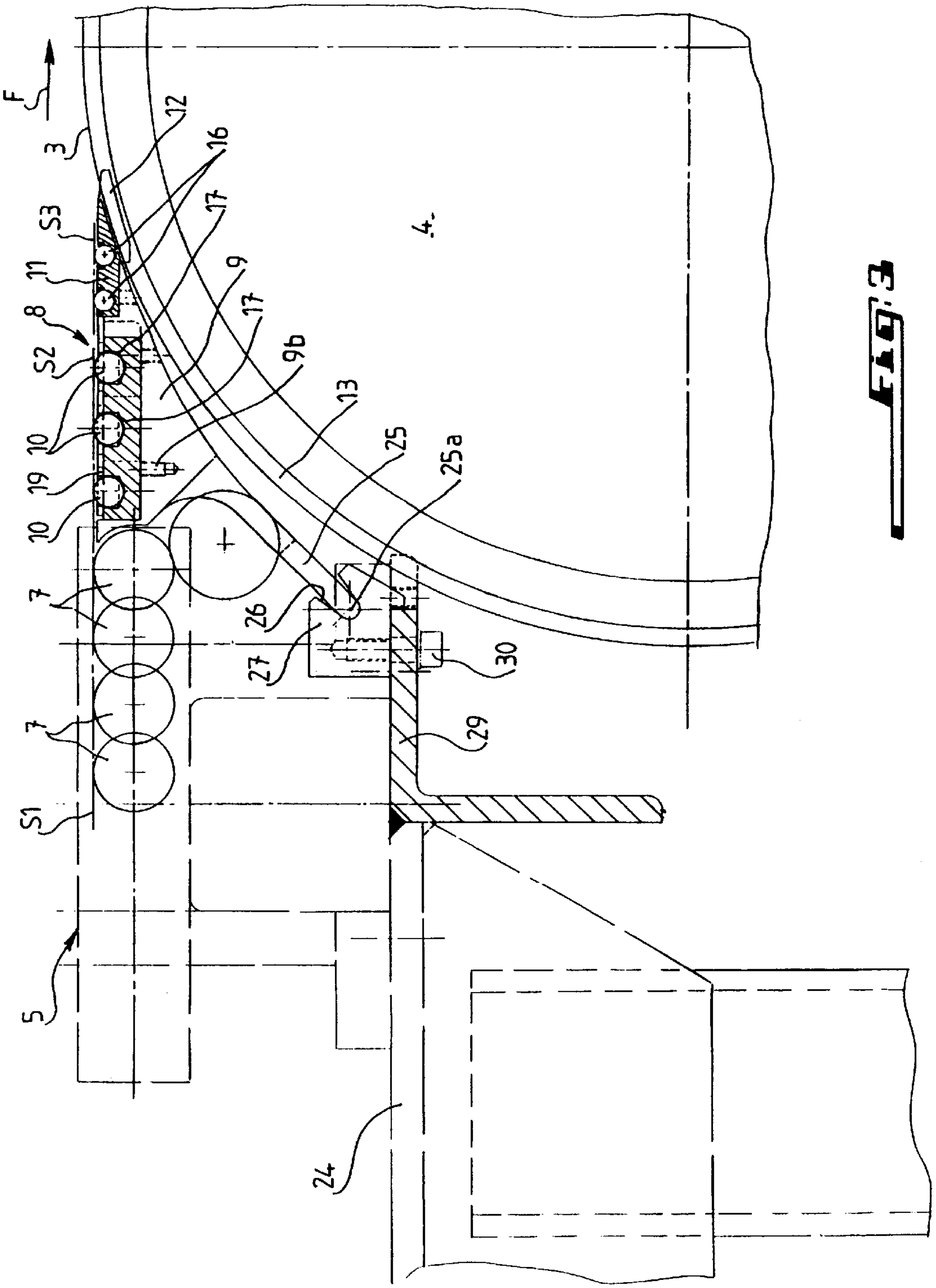
FIG. 3 is a cross-sectional view from the line III—III of FIG. 2.

The acceleration and deceleration elements 5 and 6 are known as disclosed in the reference EP-A-0 509 861. More specifically, the acceleration element 5 and the deceleration element 6 comprise a series of parallel rolls, imbricated into each other to forming continuous transport surface for pedestrians. The rolls are driven at speeds that gradually increase from an entry roll of the acceleration element 5 to an exit roll of this element. The rolls' speed gradually decrease from an entry roll of the deceleration element 6 to an exit roll of this element. FIG. 3 shows the acceleration element 5 comprising rolls 7 imbricated into each other and defining the transport surface S1 for pedestrians.

A transfer device 8 is disposed in the transition zones between the acceleration element 5 and the conveyor belt 3, and between the conveyor belt 3 and the deceleration element 6, to allow pedestrians to cross these transition zones without any loss of equilibrium. As shown in FIGS. 2 and 3, each transfer device 8 comprises a platform 9 having a pedestrian bearing-surface S2 located substantially in a plane common to the transport surface of the conveyor belt 3 and to the transport surface S1 of the acceleration element 5 or of the deceleration element 6. The transfer device comprises rollers 10 permitting low friction displacement of pedestrians between the acceleration element 5 to the conveyor belt 3 and from the conveyor belt 3 to the deceleration element 6.

The transfer device 8 comprises a comb-shaped plate 11 having teeth 12 that engage longitudinal grooves of the conveyor belt 3 defined between conveyor belt ribs 14. The comb-shaped plate 11 is fastened to the platform 9, for example by fastening screws 15. The pedestrian bearing-surface S3 of the comb-shaped plate 11 is in substantially the same plane as the bearing surface S2 of the platform 9. Bearing surface S3 is defined by rollers 16 that permit the low-friction displacement of the pedestrians from the comb-like plate 11 to the conveyor belt 3 or vice versa.

Figures 5, 9:
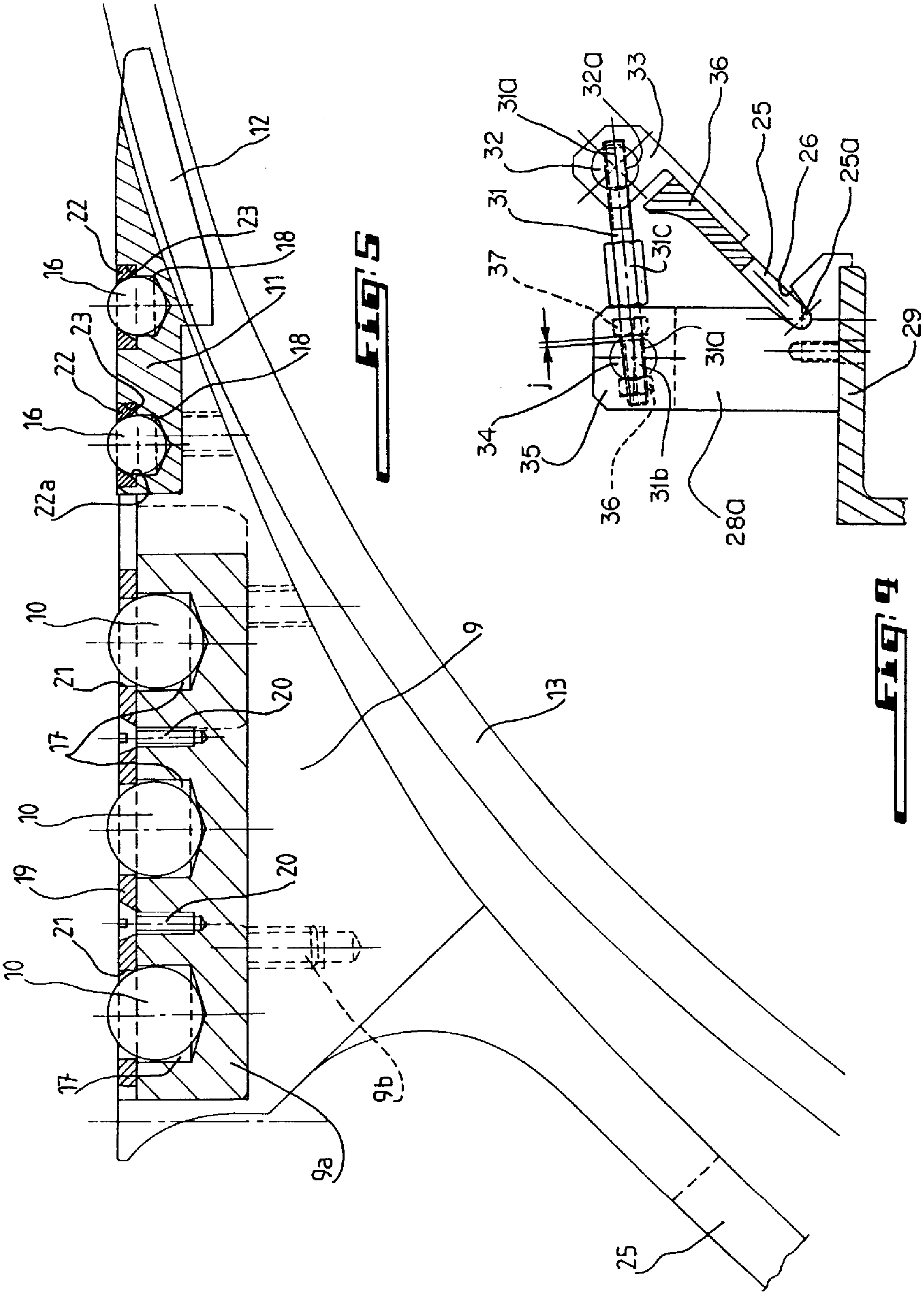
FIG. 5 is an enlarged view of the upper portion of the transfer device shown in FIG.3.

Preferably, the rollers of the platform 9 and of the comb-shaped plate 11 comprise balls 10 and 16. As shown more clearly in FIG. 5, balls 10 and 16 are disposed within blind holes 17 in the platform 9. Balls 16 are housed within blind holes 18 of the comb-like plate 11.

The balls 10 and 16 are kept within their respective holes 17 and 18 while protruding from the platform 9 and the comb-shaped plate 11 so as to define the bearing surfaces S2 and S3. These balls 10 and 16 revolve freely about themselves in these recesses 17 and 18 as pedestrians pass over them.

More specifically, blind holes 17 are formed in a plate **9*a* fastened to the platform 9 by screws 9*b*. A plate 19 is fastened to the plate 9*a*, for example by fastening screws 20. The plate 19 comprises bores 21 aligned with balls 10 but having a smaller diameter than that of balls 10**.

The balls 16 are retained in therein corresponding blind holes 18 in the comb-like plate 11 by flat washers 22. Each washer is accommodated in a counter-bore 23 machined into the plate 11. Each washer 22 has a central frusto-conical opening **22*a* for retaining a ball 16 within its hole 18**.

According to an alternative embodiment not shown, the rollers 10 and 16 are cylinders mounted transversely of the longitudinal direction of the conveyor belt 3 within corresponding semi-cylindrical recesses in the platform 9 and of the comb-shaped plate 11. These cylindrical rollers protrude from platform 9 and plate 11 so to define bearing surfaces S2 and S3 for pedestrians.

Furthermore, the platform 9 of the transfer device 8 is pivotally supported on a support frame 24 by supporting feet 25 arranged symmetrically about the longitudinal axis XX' of the belt 3. The free ends **25*a* of supporting feet 25 are accommodated within inclined grooves 26 in supporting parts 27 and 28 that are secured to frame 24, the grooves 26 being aligned perpendicularly to the longitudinal axis XX' of the conveyor belt 3. Two supporting parts 27 are disposed symmetrically opposite each other about the longitudinal axis XX' of the belt 3 and are fastened to a flange of an inverted L-shaped cross member 29 by fastening screws 30. Cross member 29 is fixed to the frame 24**, preferably by welding.

The platform 9 is bilaterally fastened to the support frame 24 by two tie-bolts 31 arranged symmetrically about the axis XX' and on either side of the bearing surface S2 of the platform 9. These tie-bolts allow the slope of platform 9 to be set to a position in which the bearing surface S2 lies in a plane substantially common to the transport surfaces of the conveyor belt 3 and the acceleration element 5 or the deceleration element 6.

Each tie-bolt 31 is oriented substantially in parallel with the axis XX' and has a threaded end portion **31*a* anchored in a first corresponding tapped hole 32*a* that extends through a transverse pin 32 carried by a clevis 33 that is itself fastened to an end portion 9*c* of the platform 9. Portion 9*c* also comprises a supporting foot 25 that is inserted into the groove 26 of supporting part 28. Supporting part 28 is fastened to the cross member 29 by fastening screws (not shown). The other threaded end portion 31*b* of the tie-bolt 31 extends loosely through a bore 34*a* formed through a second transverse pin 34 carried by a clevis 35 fixed to the supporting part 28. Two nuts 36 and 37 are screwed onto the threaded portion 31*b* of the tie-bolt 31 on either side of the transverse pin 34. However, the nut 37 is not fully tightened against the second transverse pin 34, leaving a clearance j of about 2 millimeters so as to permit a slight pivoting motion of the transfer device 8 about the free ends of the supporting feet 25 in a direction tending to space the comb-like plate 11 upwards from the conveyor belt 3, as seen in FIG. 3. This pivoting motion occurs when an object becomes jammed between the longitudinal grooves 13 of the conveyor belt 3 and the teeth 12 of the comb-shaped plate 11. This motion of the transfer device 8 preferably actuates a circuit that stops the powered end-drum 4 and thus stops the conveyor belt 3. Normally, however, the transfer device 8 is kept in a stationary position by the tie-bolts 31. A central nut 31*c* permits the accurate adjustment of the position of the bearing surfaces S2 and S3 of the transfer device 8 in relation to the transport surfaces of the conveyor belt 3 and the acceleration element 5 or the deceleration element 6. As shown in FIG. 3, bearing surfaces S2 and S3 of transfer element 8 may be offset below the transport surface of the conveyor belt 3 by up to about 5 millimeters without causing any loss of equilibrium in pedestrians who cross the very small transition zone between the end of the comb-like plate 11 and the conveyor belt 3**.

The transverse grooves 26 in the supporting parts 27 and 28 permit a transverse displacement of the transfer device 8 as the free ends 25*a* of the supporting feet 25 slide along these grooves 26 by an amount on the order of a few millimeters. This sliding may occur when the longitudinal ribs 14 of the conveyor belt 3 hit the teeth 12 of the comb-like plate 11. The sliding permits the transfer device 8 to compensate for a side drift or deflection beyond the offset value d shown in FIG. 2, of the conveyor belt 3 with respect to roll 4. To permit such a transverse displacement, each transverse pin 34 is mounted into two oblong holes (not shown) of the clevis 35 extending in parallel to the axis XX' of the conveyor belt 3.

The transfer device according to the invention has an extremely simple structure, provides a bearing surface in the same plane as the adjoining elements, and permits a reversal in the conveyor belt's direction of operation. The transfer device according to the invention may also be used in conveyors called "travelators" wherein the conveyor belt consists of elements linked to each other. The device may further be installed between two sequential conveyor belts, either aligned end to end or at an angle. In embodiments disposed between two conveyors, the device will comprise two comb-shaped end plates whose teeth are inserted into the longitudinal grooves of both conveyor belts.

What is claimed is:

1. A transfer device for transferring pedestrians between a first pedestrian moving-surface and a conveyer belt having a longitudinal axis and longitudinal ribs and defining a second pedestrian-moving surface, the pedestrian-moving surfaces being substantially disposed in a common plane, said first pedestrian moving-surface having a speed varying element for altering the speed of the pedestrians between a speed of said second pedestrian-moving surface and a different speed, the device comprising:

a platform disposed substantially in said plane and in series between the speed varying element and an end of said second pedestrian-moving surface, and having a plate mounted on said platform, said plate defining a comb for slidably meshing between the longitudinal ribs of said second pedestrian-moving surface, wherein the comb is unitary construction and includes a plurality of teeth engageable between the longitudinal ribs of the second pedestrian-moving surface;

first rollers rotatably housed in said platform and protruding therefrom, said first rollers defining a first bearing-surface substantially disposed in the common plane, said first rollers allowing the low-friction displacements of pedestrians between the first and second pedestrian-moving surfaces; and second rollers rotatable housed in said plate and protruding therefrom defining a second bearing surface substantially disposed in the common plane, said second rollers allowing the low-friction displacement of pedestrians between the first bearing-surface and the second pedestrian-moving surface.

2. The transfer device of claim 1, wherein the comb defines a plurality of recesses that comprise blind holes.

3. The transfer device of claim 1, wherein the rollers comprise balls.

4. A pedestrian transfer system comprising the transfer device of claim 1, the conveyor belt defining the second pedestrian-moving surface and having longitudinal grooves, wherein the teeth are slidably engaged in the grooves; and the speed varying element, which defines the first pedestrian-moving surface.

5. A transfer device for transferring pedestrians between a first pedestrian moving-surface and a conveyer belt having a longitudinal axis and longitudinal ribs and defining a second pedestrian-moving surface, the pedestrian-moving surfaces being substantially disposed in a common plane, said first pedestrian moving-surface having a speed varying element for altering the speed of the pedestrians between a speed of said second pedestrian-moving surface and a different speed, the device comprising:

a platform disposed substantially in said plane and in series between the speed varying element and an end of said second pedestrian-moving surface, and having a plate mounted on said platform, said plate defining a comb for slidably meshing between the longitudinal ribs of said second pedestrian-moving surface, wherein the comb includes a plurality of teeth engageable between the ribs of the second pedestrian-moving surface;

first rollers rotatable housed in said platform and protruding therefrom, said first rollers defining a first bearing-surface substantially disposed in the common plane, said first rollers allowing the low-friction displacements of pedestrians between the first and second pedestrian-moving surfaces; and second rollers rotatably housed in said plate and protruding therefrom defining a second bearing surface substantially disposed in the common plane, said second rollers allowing the low-friction displacement of pedestrians between the first bearing-surface and the second pedestrian-moving surface, wherein at least one of the second rollers is housed in the teeth.

6. The transfer device of claim 5, wherein the rollers comprise balls.

7. A pedestrian transfer system comprising the transfer device of claim 5, and the conveyor belt defining the second pedestrian-moving surface and having longitudinal grooves, wherein the teeth are slidably engaged in the grooves.

8. A pedestrian transfer system comprising the transfer device of claim 5, and the speed varying element defining the first pedestrian-moving surface.

9. A pedestrian transfer system comprising:

a transfer device for transferring pedestrians between a first pedestrian moving-surface and a conveyer belt having a longitudinal axis and longitudinal ribs and defining a second pedestrian-moving surface, the pedestrian-moving surfaces being substantially disposed in a common plane, said first pedestrian moving-surface having a speed varying element for altering the speed of the pedestrians between a speed of said second pedestrian-moving surface and a different speed, the device comprising:

a platform disposed substantially in said plane and in series between the speed varying element and an end of said second pedestrian-moving surface, and having a plate mounted on said platform, said plate defining a comb for slidably meshing between the longitudinal ribs of said second pedestrian-moving surface;

first rollers rotatably housed in said platform and protruding therefrom, said first rollers defining a first bearing-surface substantially disposed in the common plane, said first rollers allowing the low-friction displacements of pedestrians between the first and second pedestrian-moving surfaces;

second rollers rotatably housed in said plate and protruding therefrom defining a second bearing surface substantially disposed in the common plane, said second rollers allowing the low-friction displacement of pedestrians between the first bearing-surface and the second pedestrian-moving surface;

the pedestrian transfer system further comprising the conveyor belt defining the second pedestrian-moving surface and having longitudinal grooves, wherein the teeth are slidably engaged in the grooves; and the speed varying element defining the first pedestrian-moving surface;

wherein said platform is supported on a support frame pivotally towards and away from said end of said second pedestrian-moving surface when an object becomes jammed between said platform and said second pedestrian-moving surface.

* * * * *